US006240639B1

(12) United States Patent
Hycner

(10) Patent No.: US 6,240,639 B1
(45) Date of Patent: Jun. 5, 2001

(54) FLUID METERING ROLL AND METHOD OF MAKING THE SAME

(75) Inventor: Stanley H. Hycner, Batavia, IL (US)

(73) Assignee: Pamarco Incorporated, Roselle, NJ (US)

(*) Notice: Subject to any disclaimer, the term of this patent is extended or adjusted under 35 U.S.C. 154(b) by 0 days.

(21) Appl. No.: 09/048,867

(22) Filed: Mar. 26, 1997

Related U.S. Application Data

(62) Division of application No. 08/744,766, filed on Nov. 6, 1996, now Pat. No. 5,857,950.

(51) Int. Cl.[7] ........ B23P 15/00

(52) U.S. Cl. ........ 29/895.32; 29/895.3; 492/30; 492/53; 492/56

(58) Field of Search ........ 29/895.32, 895.21, 29/895.3; 492/30, 50, 53, 56, 59; 427/248.1, 249.3, 249.4, 250, 251, 255.15, 255.5

(56) References Cited

U.S. PATENT DOCUMENTS 4,530,140 * 7/1985 Okamura et al. ........ 492/50
4,631,793 * 12/1986 Shintaku et al. ........ 492/53
5,324,248 * 6/1994 Quigley ........ 492/50
5,387,172 * 2/1995 Habenicht et al. ........ 492/56
5,476,685 * 12/1995 Rocher et al. ........ 427/248.1
5,686,182 * 11/1997 Maniar ........ 427/335
5,686,189 * 11/1997 Badesha et al. ........ 492/53
5,695,816 * 12/1997 Iwashita et al. ........ 427/228
6,054,177 * 4/2000 Endoh et al. .

* cited by examiner

*Primary Examiner*—I Cuda Rosenbaum
(74) *Attorney, Agent, or Firm*—Paul J. Sutton; Barry G. Magidoff

(57) ABSTRACT

A fluid metering roll such as an anilox roll is comprised of a tubular carbon fiber composition core having one or more metallic layers intervening between the core and a surface layer comprised of ceramic, the ceramic having outwardly opening fluid metering cells. The method of forming the roll includes steps of thermal spray applying one or more layers comprised of metal over the roll surface the layers intervening between the roll and an external ceramic coating. Characterizing features of the application method reside in each of the thermal spray applied layers being directed toward the core at a negative rake angle of from about 11½ to about 13½ and preferably 12½°, the core and layers which receive the thermal spray being simultaneously cooled to about 110° Centigrade or less during application of the thermal spray. The method and article are further characterized in that the coefficient of thermal expansion of the layers intervening between the core and the outermost ceramic layer form a progression whereby the intermediate layers have thermal characteristics which progressively become smaller in the outward direction.

3 Claims, 2 Drawing Sheets

FLUID METERING ROLL AND METHOD OF MAKING THE SAME

This is a division of application Ser. No. 08/744,766 filed on Nov. 6, 1996, now U.S. Pat. No. 5,857,950.

BACKGROUND OF THE INVENTION

The present invention is directed to a fluid metering roll and to a novel method of manufacturing same. More particularly the invention is directed to an anilox roll characterized in that the roll is comprised of a carbon fiber composite core having an exterior ceramic surface formed with outward opening metering cells.

It is the objective of anilox rolls to pick up liquid, typically ink, from an ink source and to deposit on a subsequent printing roller or the like, discrete increments of ink, the quantity deposited by each cell being controlled within precise tolerances across the entire surface of the printing roller, this result being effected by the anilox roller having a multiplicity of closely-spaced, i.e., up to 1,000 or more, cells per lineal inch, the cells having virtually identical volumetric capacities.

PRIOR ART

Conventional anilox rolls are manufactured from either steel or aluminum cores. The external surfaces of the cores are typically mechanically engraved with the desired cell pattern and thereafter electroplated with one or more metallic layers.

Premium anilox rolls are formed by overcoating a smooth metallic core with a metal layer or layers and thereafter depositing, by plasma spray techniques, a ceramic coating over the layers, the coating being subsequently engraved via laser technology to form the desired cell pattern in the ceramic. The ceramic is then sealed to render the same resistant to the passage of corrosive liquids through the ceramic. Representative examples of ceramic coated fluid metering rolls are described and illustrated in U.S. Pat. Nos. 4,009,658 and 4,301,730 assigned to the assignee of the instant application.

Anilox rolls as heretofore known incorporate many characteristics which are undesirable. As will be set out more fully hereinafter, drawbacks of conventional anilox rolls include high weight and inertia, characteristics which result in roll deflection, premature bearing wear, difficulty of dynamic balance, and mandated high driving forces. By way of example, a typical light weight metal core anilox roll for corrugated printing may weigh approximately 1500 pounds, whereas a comparably sized roll in accordance with the instant invention will weigh less than 100 pounds.

A further drawback of conventional anilox rolls, which typically may require use in caustic environments, resides in their low resistance to corrosion. Despite the various sealants employed in ceramic, conventional anilox rolls, and notwithstanding the nature of the electroplated layers used in fabricating metallic anilox rolls, exposure to corrosive reagents, and necessity for frequent cleaning of the anilox roll surfaces, rapidly compromises the roll, resulting in the necessity of reprocessing. In general, roll reprocessing of a steel core anilox roll may be accomplished about three times following which the roll is useless and must be discarded. When it is considered that a roll of ten-inch diameter and one hundred ten inch face length may cost up to about $14,000.00, it will be readily recognized that the ability to provide higher corrosion resistance in a roll which also permits additional reprocessing cycles will result in significant economic advantages.

High inertia conventional steel core anilox rolls must be carefully balanced to assure that the mass distribution is such that vibration is minimized. In fact, slight imbalances are governing factors in the speeds at which the roll may be employed, and hence, the speed of the printing or other process.

To summarize, it would be highly desirable to provide an anilox roll which is light in weight, stronger than steel, having low inertia, virtually perfect dynamic balance, freedom from roll deflection, high resistance to corrosion and subject to multiple cycles of reprocessing. Characteristics such as those noted will minimize down time required for roll change, ability to operate at lower power consumption, simplicity of handling, operation at higher press speeds, and decrease in waste deriving from lower initial costs and more frequent cycles of reprocessing.

PRIOR ART CITATIONS

In addition to the U.S. patents cited above, the following additional patents were located in the course of a search of the prior art effected in respect of the incident invention.

U.S. Pat. No. 2,129,125 H. D. Geyer
U.S. Pat. No. 4,835,022 Huhne
U.S. Pat. No. 4,963,404 Jenkins
U.S. Pat. No. 4,991,501 Yokoyama
U.S. Pat. No. 5,094,877 Bieringer
U.S. Pat. No. 5,153,021 Litchfield
U.S. Pat. No. 5,191,703 John
U.S. Pat. No. 5,262,206 Rangaswamy
U.S. Pat. No. 5,409,782 Murayama
U.S. Pat. No. 5,411,463 Brookstein Of the collected references, U.S. Pat. No. 4,835,022 is relevant in its disclosure of flame spray application of a composition comprised of polymer and an additive such as carbide or metal powder.

U.S. Pat. No. 4,991,501 discloses a dampening water feed roll comprised of a metal roller flame sprayed with ceramic, the pores of the ceramic being occluded with $SiO2$.

U.S. Pat. No. 5,094,877 discloses a mixture of metal and high temperature resistant polyimide used as a flame spray material for coating a substrate.

U.S. Pat. No. 5,191,703 discloses a method forming an anilox roll by coating a core with soft material, forming grooves in the material, filling the grooves with hard wear-resistant material and thereafter forming cells in the remaining islands of soft material.

U.S. Pat. No. 5,262,206 teaches forming an abradable metal coating by injecting polymeric material into the stream of combustion gases used to atomize metal wire.

U.S. Pat. No. 5,411,463 relates to a lightweight roll useful in the paper manufacture trade the roll having an outer casing and elongate fiber-filled chambers.

U.S. Pat. No. 4,963,404 is directed to an anilox roll formed by plasma-flame applying a metal adhesion layer to a thin walled metal cylinder, thereafter applying a coating comprised of ceramic and fluorocarbon polymer to the adhesion layer. Thereafter a surface pattern of cavities is formed using a laser beam treatment. The patent mentions that the core could be a plastic based material such as glass fiber reinforced polyester but does not teach or suggest how such material could be employed as a receiver for the coatings.

In addition to the above references, reference is made to the following articles dealing generally with thermal spray coatings "Let's Talk Thermal Spray" (Products Finishing, March 1993, pages 41 through 47) and "Functionally Effective Coatings Using Plasma Spraying" (*Sulzer Technical Review* 3-1986 pages 1 and following).

SUMMARY OF THE INVENTION

The present invention relates to a method of forming anilox rolls utilizing a carbon fiber composite core rather than a metal core, the core being coated via flame spray techniques with a ceramic outer layer. The invention further relates to a fluid metering roll such as an anilox roll fabricated by the novel method.

Briefly stated, while it is well known that carbon fiber composite material possesses many characteristics which would render the material ideal for use as the core of an anilox roll, and while it is conventional to form metal core anilox rolls utilizing flame spray techniques (as hereinafter defined), no one, prior to the applicant, has been able to satisfactorily apply a coating to a carbon fiber composite core which coating is suitable for use as an anilox roll.

In summary, applicant has made the surprising discovery that as a result of departure from conventional flame spray techniques and by the use of selected layering and manufacturing steps, it is possible to form over the surface of a carbon fiber composite core, an external ceramic surface suitable for engraving by known laser techniques to define the cellular configurations required for use as an anilox roll.

In evaluating the method, it must be recognized that anilox rolls, particularly those employed in the printing industry for fine printing, are precision instruments which are subjected to grueling operating conditions in use. While various flame spray techniques have been suggested for the application of merely decorative coatings to flat plastic surfaces, none of the coatings are of a nature to withstand the rigors of use in flexigraphic printing techniques. Specifically, in addition to corrosion resistance, coatings must be strongly adherent to the core so that the coatings do not flake off or otherwise become dislodged during the manufacturing steps such as machining to the necessary precise concentricity required or the conditions involved in use as an anilox roll, namely high compression against printing rolls or in other metered fluid applying processes.

More specifically, it is the essence of the instant invention, surprisingly, that an anilox roll having a carbon fiber composite core may be produced utilizing unique thermal spray manufacturing techniques, notably:

(a) the applied stream of sprayed particles is impacted against the surface of the rotating core (and subsequent layers impacted at a similar angle) at a negative rake angle (as hereinafter defined) displaced by about from 11½- to 13½- and optimally by 12½ degrees from the axis of the core;

(b) that there be spray applied one or more layers comprised of metal intervening between the core and the exterior ceramic layer, the intervening layer or layers being characterized in that the index of thermal expansion thereof progressively decreases from a maximum adjacent the core and minimum (the ceramic layer); and (c) that the surface temperature of the rotating roll be maintained at 110° centigrade or lower.

It is important to note that the application of the thermal spray layers at the noted angle is critical to the satisfactory practice of the process and is a radical departure from conventional practice wherein thermal spray is directed perpendicular to the surface to which the sprayed coating is applied.

As a result of the practice of the instant method there is formed a new, useful, and unobvious article, namely, an anilox or like fluid metering roll characterized in that the same is highly resistant to corrosion, is lightweight and hence may be readily handled and driven, is of low inertia and hence less likely to induce vibrations, is resistant to deflection, may be reprocessed by refinishing over a larger number of cycles than conventional anilox rollers, and is perfectly dynamically balanced and hence may be driven at higher speeds with less noise and vibration than conventional rolls.

The invention is further directed to a method which comprises the steps of providing a carbon fiber composite core, causing said core to rotate about its axis in a predetermined direction, applying via spray technique to the rotating core while the core is cooled to below about 110° centigrade a thermal barrier coat comprised of metal, said coat being flame spray applied at a critical angle as hereinabove set forth, the thermal barrier coat having an index of thermal expansion less than that of the core, and applying over the thermal barrier layer either directly or over an intervening bond coat a ceramic coating applied via thermal spray techniques as defined, the ceramic layer having an index of thermal expansion lower than that of the core and intervening layer or layers between the core and ceramic coat.

DEFINITIONS

Figure 1:
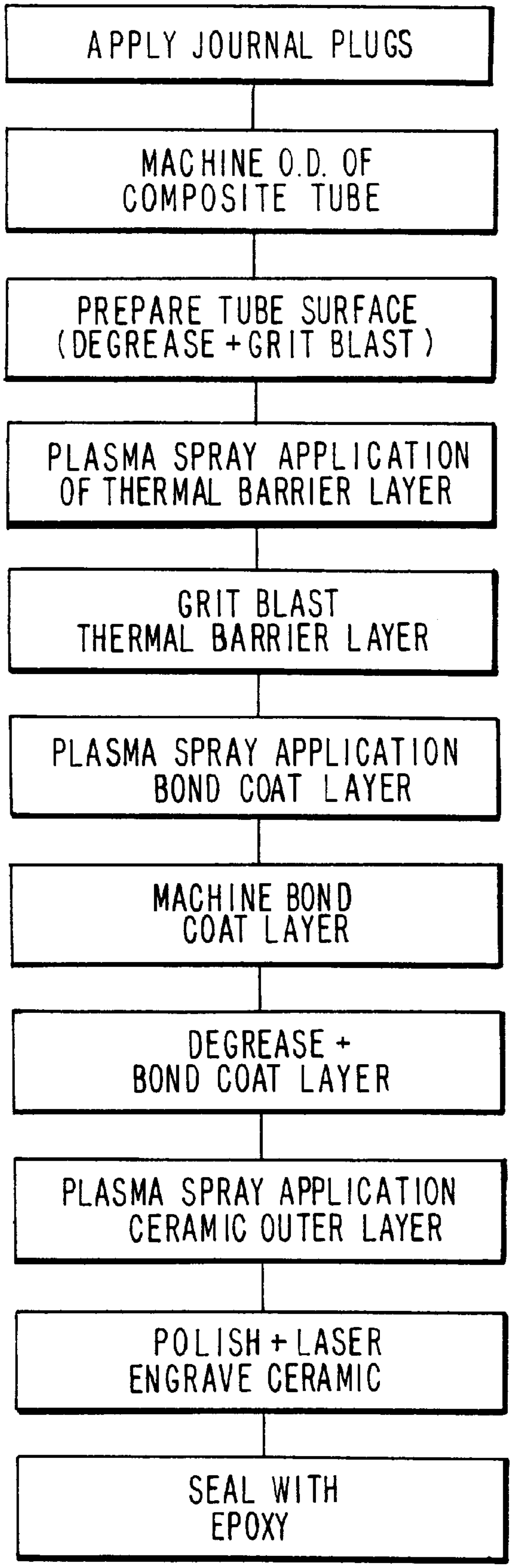
FIG. 1 is a flowchart depicting the sequence of processing steps in the manufacture of a metering roll in accordance with the invention.

The terms "carbon fiber composites" or "carbon fiber reinforced composites" as used herein denote structures wherein carbon fibers are supported in a polymeric resin matrix such as an epoxy matrix, a preferred composite employing a fiber content of 60% by volume in a unidirectional laminate the fibers being supported in a polymeric (epoxy) matrix. The terms are intended to encompass a carbon fiber core having a polymeric coating, such as a fiberglass coating.

The terms "plasma spray," "flame spray," and "thermal spray" are used herein interchangeably to denote all and any of the processes including wire flame spraying, powder flame spraying, arc wire spraying, plasma arc spraying and high velocity oxy fuel (hvof) techniques, all of which are characterized in that materials to be coated on a substrate are simultaneously melted and propelled as fine droplets onto the substrate where they solidify and adhere by mechanical and/or metallurgical interaction.

The term "negative rake angle" as used herein denotes a path of thermal spray material toward the target roll rotating in a direction away from the thermal spray source, the path of thermal spray impinging on the target at an angle above the closest point of tangency of the roll to the thermal spray source.

DETAILED DESCRIPTION

A suitable and preferred tubular carbon fiber composite core having a matrix of the isophthalic polyester variety is available from various manufacturers, including DuPont Fibers and Separations Company, of Newark, Del., or Lincoln Composites Corp., of Lincoln, Nebr. The selected tube should be 0.100" over the final intended diameter dimension. Length of the tube is desirably 0.5" longer than the intended final length. Tube thickness is standardized at 0.500".

The first procedure involves applying journal plugs to the tube ends. This process involves machining a plug part to size and adhesively bonding the plug, the size of which is specified by the end user, into the tube ends utilizing, e.g., an epoxy resin adhesive. Numerous variations in applying the journals to the tube ends are possible.

Following cure, the tube is rotated and lathe-turned to an outside diameter which is approximately 0.025" less than the intended finished diameter of the anilox roll.

It is mandatory that the tube surface be smooth and free from defects. To this end, the tube is first degreased with acetone or MEK solvent. It is then grit blasted using 500 micron aluminum oxide to further remove surface contaminants and to roughen the surface for good adhesion of the subsequently applied thermal barrier coating. To minimize undue erosion, grit blasting is effected at an air pressure of about 50–60 psi, the blasting being continued until no visible change occurs from further blasting.

Promptly following blasting, a coating (thermal barrier coating) is applied via plasma spray technique. The thermal barrier coating may be comprised of a mixture of aluminum bronze with a 10% additive of polyester; a nickel-chrome mixture (80-20) or zinc. Preferably the thermal spray process employed in applying zinc is an arc wire spray process.

Figure 2:
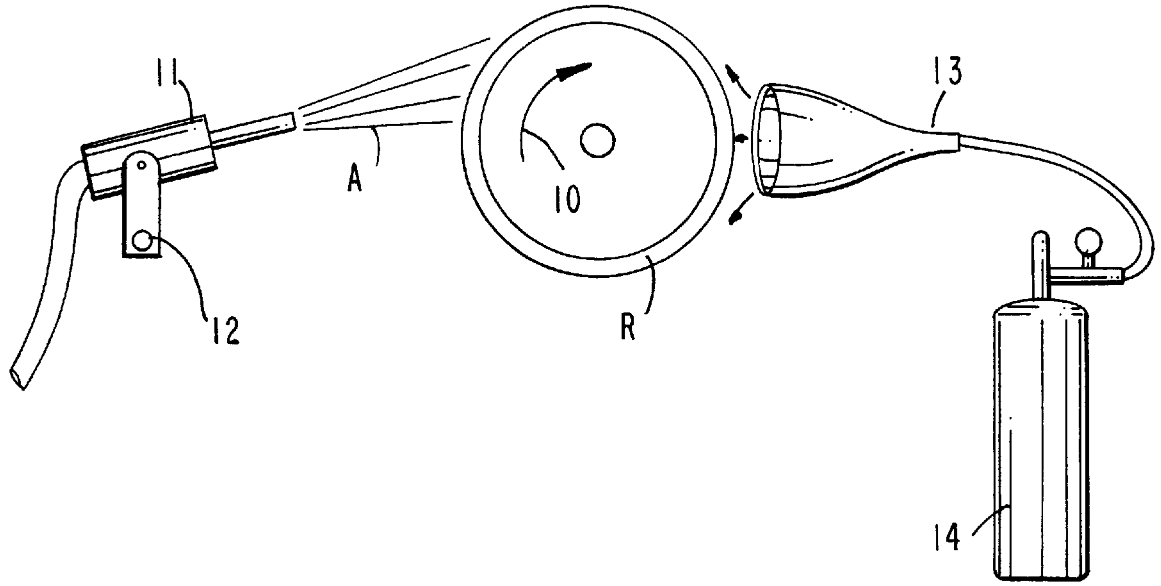
FIG. 2 is a schematic view depicting the manner of application of thermal spray material to the roll.
Figure 3:
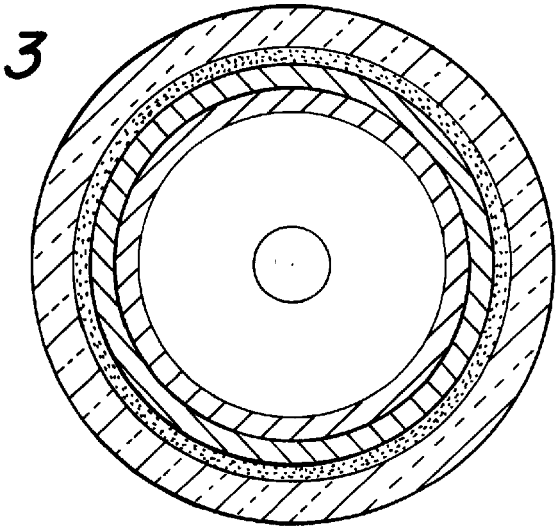
FIG. 3 is a schematic cross-sectional view of a finished roll in accordance with the invention.

Specific details of representative examples will be provided hereafter. Basically, thermal spray application procedures will be understood from FIG. 2. The roll R is rotated in the direction of the arrow 10. The thermal spray apparatus 11 is mounted on a rotating screw 12 so as to move linearly in a direction parallel to the axis of rotation of the roll. The roll R is cooled during the thermal spray application as by high pressure air stream emerging from manifold 13 or nitrogen gas under pressure from nitrogen source 14. The volume of air or nitrogen feed is adjusted such that the surface temperature of the roll as it passes the manifold is not above 110° centigrade and preferably not above 100° centigrade. The flow parameters to achieve the desired cooling characteristics may be readily determined on a trial and error basis in accordance with such factors as intensity of the thermal spray, spacing of the coolant, nature of cooling forces employed, etc.

Thermal spraying is carried out until a coating of between 0.004 and 0.005 inches is formed on the roll. Importantly, the spray application is applied in a manner which is at variance with conventional thermal spray techniques. Specifically, in conventional practice the spray stream is directed at the target such that the stream is perpendicular to the surface. In the case of a cylindrical object, the standard practice would be to direct the thermal spray toward the axis of the member be coated. Attempts to effect thermal spray coating of a carbon fiber composite with the conventional (toward the axis) technique have proven ineffective. Specifically, such attempts have resulted in destruction of the core. Attempts using conventional techniques to reduce the heat of impact and thereby avoid destruction of the core by moving the thermal spray source further from the surface of core or by extensive cooling of the core have resulted in a coating which is not sufficiently adherent to survive the necessary subsequent machining steps. Specifically, while a layer which to the eye appears satisfactory may be formed on the core, the layer is not sufficiently adherent to withstand the necessary subsequent machining steps in the formation of an anilox roll. As will be pointed out more specifically hereafter, a subsequent layer or layers are applied over the initially applied thermal barrier layer and each of such subsequently applied layer or layers must be lathe-turned or machined to provide precise concentricity and absence of imperfections. Unless the first applied thermal barrier layer is strongly adherent to the core, any such machining step will simply peel or otherwise displace the thermal barrier layer from the core.

The invention hereof is in part predicated on the discovery that by applying the thermal spray at a negative rake angle of from about 11½° to about 13½°, and optimally at 12½°, there is formed a coating which is strongly adherent to the core, permitting subsequent machining without displacement and enabling the finished anilox roll to withstand the rigors of use without interrupting the bond between the thermally applied layers and the core.

Desirably and also in contradistinction to conventional thermal spray techniques, the metallic layers in particular are displaced from the hottest portion of the thermal spray flame. The particles will thus be expelled at about 3000 to 5000 degrees F lower than conventional (center flame) temperatures of 22 to 30000 degrees F.

While it is preferable to form a second bond coat over the thermal barrier layer, it is feasible, where zinc is employed as a thermal barrier layer to apply the final chromium oxide (ceramic) coating directly over zinc. In this case, a layer of 0.012 to 0.014 inches of zinc is applied the zinc layers being machined from 0.004 to 0.005 inches to eliminate imperfections.

In one variation of the procedure, the initial thermal barrier layer is not machined but rather is grit blasted following which there is plasma spray applied a second or bond coat layer. The bond coat layer is applied to a thickness of approximately 0.005 inches, the spray procedure being identical to that previously described, namely with simultaneous cooling and with the sprayed material applied at a negative rate angle of about 12.5°.

Following application of the bond coat layer (or layers) the bond coat layer is machined to assure absolute concentricity and removal of imperfections and is again degreased with organic solvent such as acetone. Following application of the bond coating a final coating of chromium oxide 0.009 to 0.010 thickness is applied again utilizing the negative rake angle previously noted. The ceramic coating is thereafter polished and laser engraved utilizing conventional techniques employed in respect of the engraving of ceramic layers formed on a conventional (metal) core anilox rolls. Polishing is effected by grinding the ceramic top coating to a thickness of approximately 0.007 to 0.008 inches polishing the surface to a finish of about 8 to 10 microinches. Where fine grain anilox pattern (greater than 180 lines per inch (lpi)) is required, the finish must be between 2 and 5 microinches AA surface finish. As is known, an anilox screen of up to 1,000 lpi is possible utilizing laser techniques.

Following laser engraving the roll is subjected to final polishing, cleaning and degreasing and is then sealed with an epoxy based sealant to protect the metallic subsurfaces and for optimum ink pick-up retention and release characteristics during the printing or coating operations to be encountered.

Processing of the thermal applied ceramic coating does not differ from the processing of conventional (metal) ceramic coated anilox rolls and further description thereof is unnecessary.

For optimum performance, the thermal spray components are applied with the roller rotating at a speed of 400 surface feet per minute, the rotational speed being independent of the diameter of the roll employed.

There follows certain specific examples in compliance with the best modes requirement of the U.S. Patent Laws. It should be recognized however that such examples should not be interpreted in a limitative sense. In all instances in the examples which follow, including application of the ceramic final coat, the thermal spray path is as applied to the roll surface at a negative rake angle of about 12.5°.

EXAMPLE 1

A carbon fiber composite roll of outside diameter 10.335" and face length of 111" sourced from DuPont Company, and identified as CFR composite, has the following characteristics: density 0.057 pounds to the cubic inch, coefficient thermal expansion $18 \times 10^{-6}$ IN/IN/° Farenheit; longitudinal tensile strength 250 kilograms per square inch, longitudinal compressive strength 160 kilograms per square inch. The specific carbon fiber reinforced composite included 60% by volume of carbon fiber in a unidirectional laminate in an epoxy matrix.

Journal plugs were fabricated and epoxy bonded into the tube ends the tube was lathe-turned to remove 0.025" of surface material. The tube was degreased with acetone and grit blasted using 35 grit (500 microns) aluminum oxide applied at an air pressure of about 50–60 psi. Thereafter, the roll was mounted and driven at a rotary speed of 400 surface feet per minute. A zinc coating of 0.010" was applied utilizing a zinc wire plasma spray gun (Hobart-Tafa wire arc gun) utilizing a green cap nozzle. Charge parameters were 25 volts and 200 amps with a spray rate of 20 pounds per hour. Spray distance was 3" and the spray apparatus was moved at a speed of 8 revolutions of roll to an inch of movement of the spray apparatus. The entire length of the roll during thermal spray application was continuously cooled to a temperature of substantially 95° centigrade by compressed air exiting a manifold offset from the thermal spray by approximately 180°. The thermal spray was applied at a negative rake angle of 12.5°. Thermal application resulted in the formation of a coating of approximately 0.010". The coated roller was grit blasted as before and a bond coat was applied thereafter. The bond coat comprised an aluminum bronze polyester mixture proportioned Cu-84%, Al-9.5%, Fe-0.9%, Polyester-5.6% by weight. The bond coat was applied utilizing a Metco 9MB gun utilizing power feeder 9MP and nozzle GH. The gun employed pick up shaft A and powder port No. 2. The powder (particle size −250 Mesh; 66 microns) was sprayed utilizing a gas mixture of 100 parts argon to 50 parts hydrogen, the argon being applied at 80 standard cubic feet per hour (SCFH) and the hydrogen at 50 SCFH. Operating parameters were 65 volt and 550 amp resulting in a spray rate of approximately 5 pounds per hour. The spray distance in this instance was 2.5"; surface speed of the roll 400 surface feet per minutes with the screwdrive for the flame spray apparatus moving at a rate of 6 revolutions of the roll per inch traverse of the spray gun. Cooling air jet manifold was spaced approximately 4.5" from the surface of the roll the coolant being pressurized air and maintained the roll temperature at a surface temperature of approximately 100° C. The molten particle temperature of the propelled particulate matter was maintained somewhat lower than the average 24,000° Fahrenheit as a result of setting the powder feeder to a level somewhat above normal such that the bond coating is propelled below the highest heat portions of the flame. It is estimated that the particle temperature is approximately in the range of 16–18,000° Fahrenheit. The result of the thermal spray was the build up of a bond coating of approximately 0.005".

The bond coat was machined to remove irregularities grit blasted and degreased as before, prior to application of the final plasma spray ceramic layer.

A final layer of 0.009–0.012 inches of ceramic (chromium oxide) was applied via plasma thermal spray according to the following parameters:

A chrome oxide powder of (−325 Mesh, 22.5 microns) particle size was applied via Metco 9MB gun power feeder 9MP utilizing nozzle GH powerport No. 1 and pick up shaft A. Gases employed were argon 80 parts, hydrogen 50 parts the argon being applied at a flow rate of 80 SCFH and the hydrogen at 15 SCFH. The electrical parameters were 63 volts at 500 amps. The particles were applied at a spray rate of 5 pounds per hour the carrier gas for the powder being applied at 80 psi at a flow rate of 15 standard cubic feet per hour (SCFH). Air vibrator operated at 25 psi the spray distance 2.5". Surface speed of the roll was 400 surface feet per minute with the gun moving a rate of 6 revolutions of the roll for an inch traverse of the gun. While the ceramic coat can be applied conventionally, i.e., perpendicular to roll surface per U.S. Pat. Nos. 4,009,658 and 4,301,730, application at the negative rake angle set forth is preferred.

The coating (approximately 0.009–0.012 inches) was subsequently polished, laser engraved, and sealed in accordance with conventional practice, per the patents last above noted.

EXAMPLE 2

A carbon fiber composite roll of the characteristics noted above and dimensioned as before and formed with a zinc thermal barrier layer as previously described was overcoated with a bond coat comprised of nickel and chromium (80/20) by weight. A bond coat of 0.005 inches was formed utilizing Metco 9MB gun, 9MP power feeder nozzle GH; pick up shaft A; powerport 2 operating at electrical parameter of 70 volts 500 amps spray rate 10 pounds per hour. Gas pressure employed was 100 parts argon to 50 parts hydrogen, argon at 80 SCFH and hydrogen at 15 SCFH. Spray distance was 4.5 inches, surface speed of the roll was 400 surface feet per minute, the roll rotating 6 rotations per 1" traverse of the applicator gun.

The bond coat thus formed was machined, degreased, plasma sprayed as before.

While it is preferred to employ both a thermal barrier layer and a bond coat layer prior to application of the ceramic layer, it is feasible in some instances to apply the ceramic layer directly over a thermal barrier layer. Direct coating with ceramic is particularly feasible utilizing zinc as the thermal barrier layer.

Satisfactory thermal barrier coatings have been comprised of combinations of nickel, chromium, iron, molybdenum and aluminum, proportioned by weight as follows: 55%, 17%, 6%, 17% and 5%. A further successfully employed thermal barrier coating is comprised of nickel, chromium, aluminum and yttrium, proportions 79%, 9%, 7% and 5%. Particle size ranges 10 microns to 44 microns. Application parameters for these alternative coatings are similar to those for the nickel chromium coating described in Example No. 2. As a general guide, it is preferred that the thermal barrier coating be from 0.004–0.006 inches, the bond or intermediate coating from 0.004–0.005 inches, and the final ceramic coating 0.007–0.008 inches.

The advantages of the anilox roll in accordance with the invention as compared to steel cored roll are readily apparent from a comparison of the physical characteristics thereof of the respective products. A steel roll of 10.33" OD and 111.0" face weighs 1710 pounds, as opposed to 85 pounds for a carbon fiber roll. Steel roll has a strength of $30\times10^6$ psi; strength of a carbon fiber roll being $59\times10^6$ psi. Deflection (sagging of roll supported at its ends) of a steel roll at zero load is over ten times greater than that of the carbon fiber roll and over five times the deflection of the carbon fiber roll under doctor blade loaded condition.

Due to the weight and high inertia of the steel roll the same must be dynamically balanced, a practice not required with carbon fiber anilox rolls in accordance with the invention.

The carbon fiber roll has a far greater corrosion resistance than the steel roll and can be reprocessed three to five times. A steel roll can be reprocessed at the most two to three times.

As will be apparent from the preceding, there is provided in accordance with the present invention a method of manufacturing an anilox roll having a carbon fiber composite core and an external ceramic surface utilizing uniquely modified thermal spray procedures. Specifically, it has not been heretofore possible to provide coatings over carbon fiber composites which exhibit the necessary strength and tenacity as has been accomplished with the procedures of the present invention. Specifically, it is believed that the utilization of a critical spray angle, optimally 12.5° at a negative rake angle enables the desired adherent coating to be formed. The reasons for the formation of a successful coating based on departures from normal thermal spray practices are unknown. It has been theorized that by inducing particle impact at the critical angle noted the subsequently applied particles synergistically interact with prior applied particles such that a combined metallurgical bond and wedging action occurs. However, applicant is not to be bound by any theory.

There is further disclosed in accordance with the instant invention a new article of manufacture not previously attainable, namely, a lightweight ceramic coated anilox roll having unique properties which render the same especially desirable. Specifically and most importantly, the lighter weight and additional strength of the roll and its susceptibility of additional cycles of reprocessing have resulted in the provision of a metering roll for use in anilox and like fluid metering environments which is superior to any device heretofore known.

Although the known characteristics of carbon fiber composite materials are such that this material might be recognized as a desirable core for anilox rolls, no one, prior to applicant, has successfully fabricated a carbon fiber core anilox or metering roll having a metal or ceramic coating. The unique thermal spray techniques as disclosed herein for the first time enable the formation of satisfactory coatings on a carbon fiber core.

As will be apparent to those skilled in the art and familiarized with the instant disclosure, certain variations in formulation and processing steps may occur without departing from the spirit of the invention. Accordingly the invention is to be broadly construed within the scope of the appended claims.

What is claimed is:

1. The method of manufacturing a ceramic coated fluid metering roll having a carbon fiber composite core comprising the steps of providing an elongate cylindrical carbon fiber core, causing said core to rotate about its longitudinal axis, applying a thermal barrier layer comprised of metal to the surface of said rotating core via a flame spray procedure; thereafter applying a ceramic coating over said thermal barrier layer via a flame spray procedure, said spray procedures being characterized in that the spray stream is directed toward said surface at a negative rake angle displaced by from about 11½–13½ degrees from the axis of said core and by the surfaces of said core and barrier layer respectively being cooled to a temperature not greater than about 110° C. during the spray procedure.

2. The method in accordance with claim 1 and including the step of applying a bond layer comprised of metal over said thermal barrier layer in advance of applying said ceramic coating.

3. Method in accordance with claim 2 when said bond layer is applied by a flame spray technique characterized in that the spray stream is directed toward said surface at a negative rake angle displaced by from about 11½–13½ degrees from the axis of said core.

* * * * *